Nov. 11, 1969       T. A. CECIL ET AL       3,477,565
METHOD FOR THE SIMULTANEOUS CONCENTRATION OF CONSTITUENTS
OF SOLID MIXTURES IN LIQUID SUSPENSION
Filed May 22, 1967
SEPARATION OF ATTAPULGITE FROM BENTONITE BY
STRATIFICATION OF DEFLOCCULATED CLAY SUSPENSION
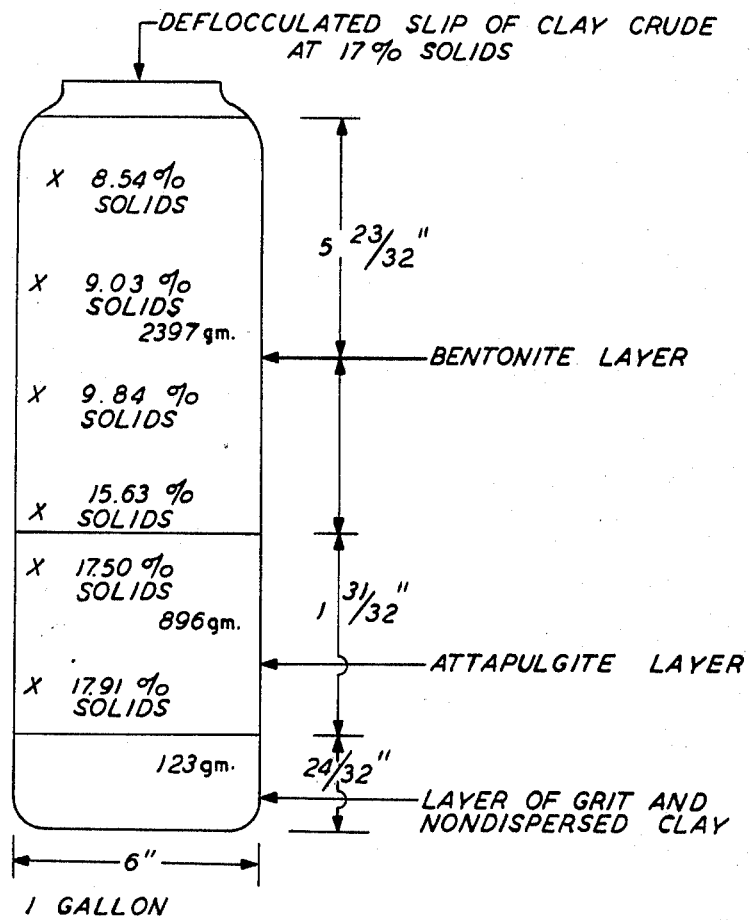
INVENTORS
TOM A. CECIL
HAROLD J. GERSTENMIER
HERBERT R. HAMILL
VICTOR PUSKAR
BY
ATTORNEY United States Patent Office 3,477,565
Patented Nov. 11, 1969

3,477,565
METHOD FOR THE SIMULTANEOUS CONCENTRATION OF CONSTITUENTS OF SOLID MIXTURES IN LIQUID SUSPENSION
Tom A. Cecil, Highland Park, Harold J. Gerstenmier, Menlo Park, Herbert R. Hamill, Iselin, and Victor Puskar, Piscataway, N.J., assignors, by mesne assignments, to Engelhard Minerals & Chemicals Corporation, Menlo Park, N.J., a corporation of Delaware
Filed May 22, 1967, Ser. No. 640,313
Int. Cl. B03d 3/06
U.S. Cl. 209—5                             12 Claims

ABSTRACT OF THE DISCLOSURE

A flocculable-deflocculable mixture of very finely divided particles, such as a mixture of colloidal attapulgite and colloidal bentonite in a clay crude, is formed into a concentrated deflocculated fluid suspension. The suspension is aged quiescently in the form of a shallow pool until finely divided particles concentrate in well-defined strata of deflocculated particles, the strata differing from each other in the finely divided constituent and also differing from each other in solids content. Thus, in the bentonite-attapulgite separation, the bentonite concentrates in an upper, relatively dilute (low solids) deflocculated stratum simultaneously with the concentration of the attapulgite in a lower more concentrated deflocculated stratum. When present, grit or nondeflocculated particles form a bottom, nondispersed layer or sludge. The strata are separated and, if an improved recovery and/or purity is desired, a deflocculated stratum is diluted with more liquid and permitted to restratify by the prolonged quiescent aging. The process is also used to separate finely divided mineral coloring matter from clay, to separate clay from diatomaceous earth and to separate constituents of phosphatic slimes.

The accompanying figure is a drawing illustrating diagrammatically an actual separation of bentonite mineral matter and attapulgite in a Georgia-Florida fuller's earth (attapulgite clay).

BACKGROUND

Slimed mineral mixtures do not respond to many of the mineral beneficiation processes which are useful with coarser ores or sands. For example, ore separation processes utilizing principles of flotation lose much of their effectiveness when applied to slimed ores such as, for example, clays and phosphatic slimes. With the exception of certain specialized flotation and agglomeration processes, most wet-separation processing of slimed ore pulps is confined to operations such as for example degritting, thickening, dewatering and particle size fractionation. These processes, which utilize Stokes' law for rate of settling of solid particles in a fluid, do not bring about the concentration of the constituents of suspended finely divided solid mixtures on the basis of species.

To the best of our knowledge the separation of slimed minerals on the basis of mineral species rather than size has heretofore required the use of selective organic flocculating agents or flotation oils. Such processes had been of very limited usefulness in separating extremely finely divided minerals having similar properties, e.g., a mixture of clay minerals. Further, undesirable and frequently expensive organic materials are introduced into the mineral matter.

THE INVENTION

An object of this invention is to provide a method for the separate concentration of the constituents of finely divided solid mixtures in liquid suspension.

It is a further object to provide such a method which can be carried out without using chemical reagents such as organic flotation reagents, agglomerating oils or flocculating agents.

The invention is especially concerned with the separate concentration of colloidal mineral particles (heterogeneous slimes) in aqueous suspension.

We have accidentally discovered a method for separating a mixture of slimed particles from each other by a unique stratification process wherein the slimes in the mixture are simultaneously concentrated in a plurality of deflocculated strata on the basis of mineral species.

In accordance with this invention, an apparently homogeneous, concentrated but fluid deflocculated dispersion or suspension of slimed heterogeneous particles is formed, and the dispersion is aged under quiescent conditions (without agitation or turbulence) for a relatively long time while in the form of a shallow pool. Surprisingly, after being aged in this manner for an adequate time, the dispersion separation on a basis of difference of particle species into at least two well-defined horizontal strata of deflocculated solid particles, each stratum being a concentrate of a constituent in the original apparently homogeneous deflocculated mixture. A nondispersed sediment may also be formed below the horizontal strata of deflocculated particles when the particles are associated with coarse grit or nondispersed matter. In this case, the formation of the sediment or sludge takes place before stratification of the deflocculated slimes occurs. Generally, the solids content is uniform throughout each stratum but the strata differ from each other in solids, with the solids content increasing from the top to the bottom layers.

A surprising and unexpected feature of our process is that a plurality of well-defined strata of deflocculated particles form. In conventional sizing operations, a non-deflocculated sediment may form or a deflocculated or flocculated pulp or suspension may gradually increase in solids in a direction towards the base of the pulp. However, in these conventional operations subsidence follows Stokes' law and well-defined layers of deflocculated minerals are not formed. In our process, in contrast, strata of markedly different solids content and mineral species are formed.

Another surprising feature of our process is that the unexpected stratification which does take place occurs in a manner such that the particles segregate and concentrate in horizontal layers on a basis of species. It would have been more logical to expect that when the unexpected stratification did take place that the stratification would have taken place on the basis of particle size per se, not particle species.

Thus, it can be seen that our method operates in a manner different from conventional sedimentation and hydroclassification procedures and depends upon a phenomenon not utilized in the conventional hydroclassification and other sedimentation processes.

The nature of our stratification process and some aspect of the process may be better understood by the following brief descriptions of several embodiments thereof.

In accordance with one embodiment, the mineral attapulgite (a colloidal acicular magnesium aluminosilicate clay mineral) is separated from bentonite (a colloidal layered or plate-like clay mineral). These minerals are found together in certain clay crudes which usually also contain quartz grit and some calcite. Frequently, minerals such as sepiolite and ferruginous minerals are also present. The attapulgite clay crude is formed into a concentrated but fluid deflocculated suspension by mixing ground crude with water and a deflocculating agent and shearing the mixture. The grit settles or is separated by screening and/or centrifuging. The degritted fluid deflocculated suspension is allowed to stand in a shallow pool until distinct layers form. The suspension is thixotropic and therefore is somewhat more viscous when at rest than when sheared at high shear rates. The bentonite concentrates to a remarkable extent in the layer (in spite of the fact that it is a bulkier mineral) and the attapulgite concentrates in the lower layer. Surprisingly, no stratification occurs if the same degritted deflocculated slip is aged for very long periods of time in a long thin tube which is maintained vertically. However, when this same tube is placed in a horizontal position, corresponding to shallow bed quiescent aging, stratification does occur.

The process can be operated to improve the recovery and/or purity of the attapulgite or bentonite-rich layer. For example, to increase the purity of the attapulgite stratum, the strata are separated and the attapulgite-rich stratum, which is usually appreciably higher in solids than the original deflocculated suspension, is diluted and aged quiescently as a shallow pool until strata are again formed. The upper (bentonite) stratum is removed by siphoning or the like and the process is repeated on the attapulgite-rich layer until an attapulgite of desired purity is obtained.

In accordance with another embodiment of our invention, phosphatic slimes, a by-product material representing a vast yearly tonnage of waste phosphate and clay minerals, is stratified to recover a phosphate concentrate and a clay concentrate(s). For example, waste Florida phosphate slimes contain an enormous amount of heretofore unused phosphate minerals, attapulgite and kaolinite as applied to such slimes, a thick pulp of the slimes is deflocculated, and aged quiescently until distinct deflocculated strata are formed. The upper stratum contains the kaolinite, a middle stratum is a concentrate of attapulgite and phosphate minerals are distributed throughout lower and upper layers. To improve purity and/or recovery, one or more of these layers can be reworked by readjusting the pulp solids and then aging until stratification takes place. In this particular slime separation process it can be seen that attapulgite is separated from kaolinite by stratification and, in addition, phosphatic material can be separated from both attapulgite and kaolinite.

Still in accordance with this invention, titaniferous discoloring matter in sedimentary clay is removed by our stratification process, the coloring matter separating as one or more deflocculated layers from a layer of deflocculated clay.

It is obvious from a consideration of the process of the invention that, in forming the strata, some of the finely divided particles in the suspension must undergo movement other than simple sedimentation. For example, in the case of the stratification separation of attapulgite and bentonite, the deflocculated suspension is initially homogeneous. The initial concentration of bentonite and attapulgite is therefore uniform throughout the depth of the pool. Obviously, the bentonite particles must move upwardly out of the attapulgite layer during stratification since, if they did not, a pure attapulgite layer would not be obtained. Thus, in our process upward movement of a substantial portion of some of the particles takes place.

It is postulated that the upward movement of particles is caused by higher hydrostatic pressure within the high solids suspension, causing (in the case of the bentonite-attapulgite separation) the upward movement of the bentonite particles. A similar phenomenon is believed to occur when carrying out other slime stratification processes within the scope of the invention.

PRIOR ART

The process of the invention is different in character and concept from processes of the prior art in which slimed minerals are separated by selective flocculation, e.g., the process of U.S. 2,981,630 to Rowland. In this process a deflocculated pulp of heterogeneous clay material exemplified by a kaolin clay having a low viscosity fraction and a high viscosity fraction, is treated with a material such as guar which selectively reacts with and precipitates one of the clays as a coagulum. The separation that takes place is a simple gravity separation between flocculated and deflocculated material. In our process, in contrast, the separation is between materials all of which are deflocculated. One advantage is that in our process, organic contaminants such as gum flocculants may be avoided. Another advantage is that we have achieved separation of mineral mixtures such as mixtures of attapulgite and bentonite which have not responded in the desired manner to selective flocculation with guar gum and the like.

Our process differs also from the prior art use of clay suspensions to provide so-called "hindered settling" of granular particles for transport purposes, for example. Here again there is no stratification of deflocculated phases.

DETAILED DESCRIPTION

A characteristic of the process of the invention is that particles are separated from flocculable-deflocculable pulps. The pulps (or suspensions) we employ are concentrated. They contain a relatively large quantity of solid surface to liquid. In the absence of deflocculating agent, these pulps would be semisolid to solid masses.

As mentioned, the invention is especially useful in separating a mixture of slimed minerals in a deflocculated aqueous suspension. The term "slimed" as used herein refers to particles 200 mesh (Tyler) or finer. The process is especially valuable in separating mixtures of particles that are finer than 10 micron (equivalent spherical diameter) since particles of such size are especially difficult to separate by conventional separation processes. Of particular benefit is the application of the process to the separation of colloidal (minus ½ micron) particles, such as the separation of attapulgite from bentonite in an attapulgite crude or the separation of slimed apatite (calcium phosphate) from attapulgite in a slime formed by the washing of Florida phosphate rock matrix.

The pulps we employ in putting the invention into practice contain from about 10% to about 60% solids. The solids vary with the nature of the solids in the pulps and with the deflocculating agent that is used. For example, kaolin clay forms deflocculated pulps that are still quite fluid at 60% solids. Attapulgite clay would form a solid mass at 60% solids even in the presence of a powerful deflocculating agent. When treating attapulgite clay by our process, pulps of about 10% to 22% solids would be used.

With pulps that are too dilute, subsidence tends to follow Stokes' law and the separation will be on the basis of particle size rather than species. Pulp solids are calculated as follows:

$$\text{Percent solids} = \frac{\text{moisture free weight of solids}}{\text{total liquid incl. weight of moisture}} \times 100$$

Moisture free weight is determined by drying the solid to essentially constant weight at about 220° F.

Employing aqueous suspending liquids to separate mineral mixtures, the deflocculating agents that may be used include, by way of example, alkali metal silicate, alkali metal condensed phosphates (e.g., sodium hexametaphosphate, tetrasodium pyrophosphate, sodium tetraphosphate), mixtures of the aforementioned alone or together with caustic (sodium hydroxide or soda ash). In some cases, the use of small amounts of additives, such as hydratable alumina, magnesia or hydratable magnesia, in conjunction with powerful dispersants such as the aforementioned sodium condensed phosphates or sodium silicate will bring about stratification in deflocculated pulps that do not stratify in the absence of the additive.

The depth of the deflocculated suspension or pulp during aging is typically up to about 4′ and will obviously vary with the separations to be effected and the equipment used. Stratification time varies with the mineral species present, deflocculating agents employed, the desired purity of the minerals in the layers, and the stratifying characteristics of the minerals being separated.

Batch or continuous operations can be carried out.

The present invention will be better understood by the following examples, given for illustrative purposes and not intended to limit the scope of the invention to the specific embodiments and features described therein.

EXAMPLE I

Separation of attapulgite from bentonite (montmorillonite) in a clay crude

In the separation process illustrated diagrammatically in the accompanying drawing, a 28.0 lb. sample of attapulgite clay crude from a mine known as "Midway" was added to 40.0 lbs. deionized water containing 68 gm. tetrasodium pyrophosphate. The clay contained about 15% volatile matter and the quantity of tetrasodium pyrophosphate employed corresponded to 1% based on the volatile free weight of the clay. (Volatile free weight is determined by heating clay to essentially constant weight at 1800° F.) The clay was agitated in the solution in a Denver Conditioner for ten minutes and then 68 gm. of pure magnesia (hydratable grade) was added, the amount of magnesia corresponding to 1% of the volatile free weight of the clay. Mixing was continued in the Denver agitator for a total of two hours.

The slip was screened through a 200 mesh (Tyler) screen. The minus 200 mesh degritted slip was centrifuged in an International Centrifuge, removing 688 gm.) dry weight) additional grit. The overflow from the centrifuge, which was a dark gray fluid suspension, was mixed in the Denver agitator for two hours and diluted to about 18% solids.

A sample of the centrifuged slip (about ⅔ gallons) was placed in a 6" diameter one-gallon jar, filling the jar to a depth of about 8". To the contents of this jar, tetrasodium pyrophosphate was added in amount of 10.80 gm., corresponding to 2% of the calculated volatile free weight of the clay in the slip. The slip was stirred for fifteen minutes. Distilled water was then added to the deflocculated slip in amount of 188 gm., thereby reducing the solids to about 17%. The jar was sealed and permitted to stand without stirring or agitation. After two weeks, the contents had separated into three distinct layers, as illustrated in the accompanying figure. The middle layer, about 2" deep, was very light in color in comparison to the other layers.

Samples were siphoned at different locations within the layers and percent solids determined. Portions of these samples were analyzed by X-ray diffraction. It was found that the middle layer, which was the lightest colored layer, was a deflocculated suspension of substantially pure attapulgite at a solids content of about 17% to 18%. This layer was well deflocculated. The top layer, also well deflocculated, was a mixture of attapulgite and bentonite and was at about 9% solids. The bottom layer, about 2¾₂" deep, was the darkest layer and contained grit and nondispersed clay material.

EXAMPLE II

Evaluation of properties of constituents of attapulgite clay

An air-dried core hole composite sample of attapulgite clay from a mine near Attapulgus, Ga., was stratified by the process of the invention and the attapulgite-enriched layer was diluted and further stratified. Various layers were analyzed to determine percent solids and, for the weight of the layer, the weight of the solids in the layer were calculated. Some of the layers were analyzed to ascertain mineralogical content and properties by X-ray diffraction. Some layers were dried and tamped volume weight determined by the procedure described in U.S. 3,278,040 to Morris M. Goldberg et al. Since bentonite and attapulgite have tamped volume weights of about 30 to 40 ft.³/lb. and 5 to 10 ft.³/lb., respectively by this procedure, the mineralogical content was estimated from measurements of this property. G.E. brightness values were also made by drying and pulverizing samples of some of the layers in order to determine whether clay material brighter than conventional degritted attapulgite could be obtained. The procedure for determining G.E. brightness is described in U.S. 2,990,958 to Greene et al. The details are as follows:

The dried core composite sample was added at 22% solids to water containing tetrasodium pyrophosphate in amount of 2.5% of the volatile free clay weight. The ingredients were mixed for two hours in a Denver Conditioner during which time the temperature of the suspension was about 102° F. The suspension was screened on a 200 mesh screen and centrifuged to remove coarse grit. The degritted slip was returned to the Denver Conditioner and agitated for two additional hours.

The slip was stored overnight in six one-gallon glass jars, each about 6" in diameter. The slips filled the jar to a depth of about 8". Four layers formed in each jar.

A top layer (about 2") was removed from each jar and analyzed for density. The product had a tamped volume weight of 43.7 lb./ft.³ and a G.E. brightness of 44.1, indicating the presence of rather pure bentonite clay. The middle and bottom layers were analyzed in similar manner. X-ray diffraction patterns of the contents of each layer showed a concentration of attapulgite in the third layer (the layer immediately above the bottom sludge layer). The attapulgite layer was returned to the gallon jar and diluted to a depth of about 8" with deionized water, mixed well and again permitted to settle, whereupon two layers appeared. The top layer was removed and the remaining slip was diluted so that the depth of the suspension was about 8", and the suspension was agitated. Upon settling for two days, four distinct layers were formed. The third layer from the top was found by X-ray analysis to be almost pure attapulgite having a tamped volume weight of 7.0 ft.³/lb. and a comparatively high brightness of 67.9%.

TABLE I.—PROPERTIES OF SOLID CONSTITUENTS OF LAYERS OF STRATIFIED ATTAPULGITE CLAY

| Layer | Principal mineral | Tamped volume wt., ft.³/lb. | G.E. brightness, percent |
|---|---|---|---|
| Top layer, first settling | Bentonite | 43.7 | 44.1 |
| 2nd layer, first settling | Bentonite attapulgite | 18.4 | 52.1 |
| 3rd layer, first settling | Attapulgite | 9.0 | 60.5 |
| Top layer, second settling | Bentonite | 38.3 | 45.9 |
| Top layer, third settling | Bentonite attapulgite | 21.7 | 50.9 |
| 2nd layer, third settling | Attapulgite | 9.8 | 55.0 |
| 3rd layer, third settling | Pure attapulgite | 7.0 | 67.9 |
| 4th layer, third settling | Nondispersed clay matter | 22.4 | 54.4 |

A summary of some of the properties of the solids in several layers appears in Table I. The data in that table show that a pure attapulgite was concentrated in the third layer of the third settling and that this mineral was very bright in comparison to the clay from which it was obtained. The data show also that the attapulgite was also much brighter than the bentonite which tended to concentrate in the top layer at each stage.

Table II includes chemical analyses of the purified attapulgite obtained in the third layer of the third stage of settling and, for purpose of comparison, an analysis of the mineral in Grim's "Clay Mineralogy," page 373 (1953).

TABLE II.—CHEMICAL ANALYSIS OF ATTAPULGITE

| | Wt. percent | |
|---|---|---|
| | Experimental purified attapulgite | Reported analysis [1] |
| $SiO_2$ | 68.11 | 68.99 |
| $Al_2O_3$ | 9.35 | 12.84 |
| $Fe_2O_3$ | 3.39 | 4.43 |
| $TiO_2$ | 0.26 | |
| CaO | 0.35 | |
| MgO | 15.89 | 13.15 |
| $P_2O_3$ | 1.32 | |
| $Na_2O$ | 0.64 | |
| $K_2O$ | 0.10 | 0.59 |
| Total (volatile free) | 99.41 | 100.00 |
| L.O.I. at 1,800° F | 20.12 | 19.86 |

[1] Converted to volatile free weight basis for purposes of comparison.

EXAMPLE III

Attempt to separate attapulgite crude into components by centrifuge

An attempt was made to separate the components of a deflocculated high solids slip of attapulgite crude by a centrifuge. A long arm centrifuge was used because of the micron size of the particles. The deflocculated slip was made up as in the batch stratification procedure previously described using a combination of tetrasodium pyrophosphate and magnesium oxide. The slip was degritted as described above.

The centrifuge was run in three stages, each stage lasting for 1½ hours. At the end of the first stage, a thin top layer was removed from a thicker middle layer and a very thick bottom layer.

Since the middle layer of batch stratifications such as those described in Examples I and II was the attapulgite layer, the middle layer from the centrifuge was diluted to the original volume of the slip and centrifuged. Again, three layers were formed. The third layer was separated and diluted to the original volume and recentrifuged. All samples were weighed and dried. From these data the weight distribution of attapulgite in the various layers was evaluated. Some of the layers were analyzed by X-ray diffraction in order to determine the mineral content.

It was found that high purity attapulgite did not concentrate in the layer next to the bottom sludge layer as in the static (beaker or jar) tests. To the contrary, the attapulgite was distributed throughout all of the layers with the greatest concentration in the bottom layer. A high recovery of purified attapulgite was not obtained. In fact, the material containing the highest concentration of attapulgite (the bottom layer of the third stage of centrifuging) contained 92.0% attapulgite and represented 11.9% of the total solids in the original sample. Expressed on another basis, this layer contained only 18.2% of the original attapulgite.

EXAMPLE IV

Stratification separation of slimed minerals in phosphatic slimes

A minus 60 mesh sample of Florida phosphate matrix containing 1000 gm. dry ore (1125 gm. "as is") was mixed at about 50% solids in 936 gm. water containing 4.68 gm. "O" (registered trademark) sodium silicate solution and 2.34 gm. high purity aluminum hydroxide. The matrix was known to contain about 234 gm. minus 325 mesh slimes per 1000 gm. dry matrix. Therefore, the quantity of "O" brand sodium silicate was 2% based on the estimated dry slime weight and the quantity of aluminum hydroxide corresponded to 1% of the dry slime weight. The matrix was agitated for one hour. The contents of the mixer were successively screened over 60, 100 and 325 mesh (Tyler) screens. All plus 325 mesh material was discarded. The minus 325 mesh slip containing 900 gm. water and 234 gm. solids (21% solids) was placed in a Waring Blendor which was operated for five minutes at low speed.

A sample of the apparently homogeneous light-tan colored deflocculated dispersion was placed in a soil cylinder. The cylinder, which had a diameter of 6.2 cm., was filled to a depth of 41.5 cm. After standing for three days the dispersion had separated into four distinct layers. The bottom layer was dense, very dark and nondispersed. The upper three layers were well deflocculated. The third layer (the layer above the dark bottom layer) was white in comparison to the other layers. The height of the top (first layer) was 37.6 cm. and analysis showed it contained 11.6% solids. The second layer (the layer next to the top) was 1.2 cm. and it contained 14.6% solids. The next two layers, which were 1.7 and 1.0 cm. deep, were so thick that they could not be siphoned by pipetting. They were therefore combined and identified as the bottom layer. Mineralogical content of the layers was identified by X-ray analysis. The results, summarized in Table III, indicate that the white middle layer was practically pure attapulgite and that the kaolinite (another clay mineral) had concentrated in the top layer above the attapulgite layer along with phosphate. Phosphate was also present in the bottom layer.

TABLE III.—STRATIFICATION SEPARATION OF PHOSPHATIC SLIMES

| Stratum | Percent solids in stratum | Gm. | Percent wt. | Mineral content |
|---|---|---|---|---|
| Top | 11.6 | 151.3 | 76.3 | Montmorillonite, apatite (phosphate) kaolin. |
| Middle | 14.6 | 6.1 | 3.1 | Practically pure attapulgite. |
| Bottom (mixture) | 54.3 | 40.9 | 20.6 | Montmorillonitic mineral, apatite, quartz. |
| | | 198.3 | | |

EXAMPLE V

Separation of anatase (yellow-form) from kaolnite

The starting clay used in this experiment was a filter cake of a fine size fraction ("HT" grade) of high purity discolored Georgia kaolin clay. This cake was obtained by blunging kaolin clay from a mine near McIntyre, Ga., in dilute sodium silicate solution, degritting to substantially minus 325 mesh using a stationary wet system, and hydroclassifying the degritted slip in a centrifugal sizer. The "HT" fraction was obtained from a bank of sizers producing a product calculated to contain 78% to 82% by weight of particles finer than 2 microns. The "HT" fraction was screened to remove tramp material, bleached with zinc hydrosulfite, thickened and filtered to produce a cake having a putty-like consistency. The clay in the filter cake was high purity kaolinite containing a titaniferous mineral matter which does not bleach and imparted an undesirable yellowish-brown color cast to the kaolinite. The $TiO_2$ content of the clay in the cake was only about 1.6% by weight but this quantity was sufficient to detract significantly from the brightness of the clay.

The filter cake, containing 64% solids, was made down into 40% solids deflocculated slips by agitating 1510 gm. batches of the filter cake in 938 ml. deionized water containing 5 gm. tetrasodium pyrophosphate (0.5% tetrasodium pyrophosphate based on the moisture free weight of the clay in the filter cake). The agitation was carried out in a Waring Blendor operated at low speed for ten minutes.

The batch was placed in an 1800 ml. beaker to a depth of about 10" and allowed to settle for eighteen hours without being stirred or mixed.

After settling for eighteen hours, the slip had separated into three distinct layers. The lower layer was very dark in comparison to the middle and upper layers, indicating that colored titania impurity had concentrated in the lower layer. The upper layer, however, was distinctly yellow or creamy in comparison to the middle layer, indicating that the middle layer was relatively low in $TiO_2$ content.

The top and middle layers were removed by careful siphoning after settling eighteen hours and the bottom layer was removed from the beaker. The top and middle layers were returned to the beaker, diluted with water to a depth of about 10" and allowed to settle for five days, forming two distinct layers. The top layer was separated by careful siphoning from the lower layer.

Samples of each layer were dried overnight in an oven maintained at 150° F. and pulverized through a 0.020" screen to permit brightness measurements to be made. Samples were analyzed for $TiO_2$ content.

The results are summarized in Table IV.

TABLE IV.—SEPARATION OF COLORED IMPURITY FROM KAOLINITE BY STRATIFICATION

| | Percent solids | Yield, percent | Brightness, percent [1] | $TiO_2$, percent | $TiO_2$ distribution, percent |
|---|---|---|---|---|---|
| Top layer (second settling) | 18.5 | 21.2 | 84.0 | 2.16 | [2] 28.5 |
| Bottom layer (second settling) | 52.2 | 64.0 | 88.6 | 0.58 | [2] 23.1 |
| Bottom layer | 64.4 | 14.8 | 74.7 | 5.27 | [2] 48.4 |

[1] After bleaching with zinc hydrosulfite.
[2] 1.61% $TiO_2$.

The data in Table IV show that 64% of the clay in the filter cake was recovered as a purified clay product of improved brightness. The titania content of this purified clay was only 0.58%, about one-third of the $TiO_2$ content of the starting clay. Most of the titania (48.4%) concentrated in the lower layer.

This result was surprising since the titania usually follows the fine clay particles in conventional classification processes and it was therefore expected that the titania in the fine size fraction of clay would concentrate in the top layer, not in the bottom.

X-ray diffraction patterns, employed to analyze the mineralogical matter in the illustrative examples, were obtained as follows:

Dispersions of minerals to be analyzed were diluted to 2% with distilled water and agitated in a Waring Blendor. Using an automatic pipette, 1 cc. of the suspension was spread evenly over the entire surface of a 27 x 46 mm. glass slide and allowed to dry in the air. All slides were treated with ethylene glycol to give a uniform montmorillonite (bentonite) peak by contacting the slides with ethylene glycol vapors.

The slides were scanned at 2°/minute through 30°2$\theta$ using nickel-filtered copper X-radiation. Attapulgite had a peak of maximum height at $d=10.5$ A.; montmorillonite at $d=17.0$ A. and quartz at $d=3.34$ A.

We claim:

1. A method for separating components of a finely divided mixture of particles differing from each other in composition, which finely divided mixture of particles is capable of being flocculated and deflocculated in aqueous medium, said method comprising forming an apparently homogeneous, fluid concentrated deflocculated dispersion of said mixture of particles by agitating said mixture in water in the presence of a deflocculating agent and employing a quantity of said mixture of particles such that a nonfluid mass would be formed in the absence of said deflocculating agent, maintaining said dispersion quiescent while it is in the form of a shallow pool for a substantial period of time, and until well-defined strata of deflocculated particles form in said pool, said strata differing from each other in the composition of finely divided particles therein, and separating said strata from each other, whereby particles of different composition are obtained in different strata.

2. The method of claim 1 wherein each stratum differs from the other stratum in the solids content and the solids content of the strata increase in a direction downwardly towards the bottom of said pool.

3. The method of claim 1 wherein said dispersion stratifies into deflocculated strata at least one of which is higher in solids than the original apparently homogeneous dispersion.

4. The method of claim 1 wherein said mixture of particles comprises mineral matter.

5. The method of claim 1 wherein said mixture of particles comprises at least one silicate mineral.

6. The method of claim 4 wherein said mixture of particles comprises clay.

7. The method of claim 4 wherein said mixture of particles comprises a plurality of clay minerals differing from each other in species and in shape.

8. The method of claim 6 wherein said deflocculated dispersion has thixotropic properties.

9. A method for separating the mineral attapulgite from the mineral bentonite which comprises dispersing a mixture of said minerals in water in the presence of a deflocculating agent using only sufficient water to form a uniform fluid dispersion which would be nonfluid in the absence of said deflocculating agent, maintaining said dispersion without agitation while in the form of a shallow pool until a plurality of deflocculated aqueous strata form, an upper deflocculated stratum being a concentrate of bentonite and a lower deflocculated stratum being a concentrate of attapulgite, and separating said stratum which is a concentrate of attapulgite from said stratum which is a concentrate of bentonite.

10. A method for obtaining substantially pure attapulgite from attapulgite clay crude containing a substantial amount of bentonite and also forming a fluid deflocculated dispersion of said clay by agitating said clay in the water in the presence of a deflocculating agent, removing coarse grit from said dispersion by causing said grit to form a sediment, while the resulting degritted dispersion is deflocculated and fluid and has a solids content within the range of 10% to 22% by weight, maintaining the dispersion quiescent in the form of a shallow pool until at least two well-defined strata of deflocculated mineral particles appear, an upper deflocculated stratum being richer in bentonite than said degritted crude, a lower deflocculated stratum being richer in attapulgite than said degritted crude.

and separating said stratum richer in attapulgite from said stratum richer in bentonite.

11. The method of claim 10 wherein said stratum richer in attapulgite is higher in solids than said original dispersion and is diluted with water, the diluted stratum allowed to age quiescently as a shallow pool until a multiplicity of deflocculated strata form, and an attapulgite rich stratum separated.

12. The method of claim 10 wherein said stratum richer in bentonite is lower in solids than said original dispersion and is diluted with water, the diluted stratum allowed to age quiescently as a shallow pool until a multiplicity of deflocculated strata form, and a bentonite rich stratum separated.

References Cited

UNITED STATES PATENTS

| | | | |
|---|---|---|---|
| 1,233,713 | 7/1917 | Schwerin | 209—5 |
| 1,324,958 | 12/1919 | Feldenheimer | 205—5 |
| 1,402,740 | 1/1922 | Codding | 209—5 X |
| 1,774,510 | 9/1930 | Grossman | 209—5 |
| 2,981,630 | 4/1961 | Rowland | 209—5 X |
| 2,999,586 | 9/1961 | Keith | 209—5 |

HARRY B. THORNTON, Primary Examiner

R. HALPER, Assistant Examiner

U.S. Cl. X.R.

209—155